United States Patent
Moles et al.

(10) Patent No.: US 6,961,583 B2
(45) Date of Patent: Nov. 1, 2005

(54) WIRELESS NETWORK SYSTEM SELECTION MECHANISM WITHIN A MOBILE STATION

(75) Inventors: Bryan Jeffery Moles, Dallas, TX (US); Nim Keung Leung, Plano, TX (US); Sing-Wai Wu, Frisco, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 21 days.

(21) Appl. No.: 09/317,336

(22) Filed: May 24, 1999

(65) Prior Publication Data

US 2003/0017842 A1 Jan. 23, 2003

(51) Int. Cl.[7] .............................................. H04Q 7/20
(52) U.S. Cl. ............................ 455/552.1; 455/426.1; 455/435.2
(58) Field of Search ........................... 455/552.1, 553, 455/426.1, 432.1, 434, 427, 435.2, 428, 464, 435.1, 435, 426, 432, 67.1, 67.3, 552, 551, 161.1, 161.2, 161.3, 168.1, 186.1, 515; 370/342, 331, 441, 329, 330, 332, 333, 335

(56) References Cited

U.S. PATENT DOCUMENTS

| | | | | |
|---|---|---|---|---|
| 5,119,502 A | * | 6/1992 | Kallin ........................ 455/434 |
| 5,504,803 A | * | 4/1996 | Yamada et al. ........... 455/426.1 |
| 5,535,430 A | * | 7/1996 | Aoki et al. ............... 455/552.1 |
| 5,548,818 A | * | 8/1996 | Sawyer ........................ 455/515 |
| 5,722,078 A | * | 2/1998 | Przelomiec et al. ......... 455/434 |
| 5,754,542 A | * | 5/1998 | Ault et al. .................. 370/342 |
| 5,842,122 A | * | 11/1998 | Schellinger et al. ......... 455/403 |
| 5,950,127 A | * | 9/1999 | Nitta et al. .................. 455/428 |
| 5,999,816 A | * | 12/1999 | Tiedemann, Jr. et al. ... 455/437 |
| 6,006,106 A | * | 12/1999 | Cook et al. ............... 455/552.1 |
| 6,011,978 A | * | 1/2000 | Ault et al. ................ 455/552.1 |
| 6,021,328 A | * | 2/2000 | Curtis ......................... 455/443 |
| 6,085,085 A | * | 7/2000 | Blakeney ..................... 455/426 |
| 6,188,897 B1 | * | 2/2001 | Nelson ........................ 455/432 |
| 6,625,132 B1 | * | 9/2003 | Boettger et al. ............ 370/329 |
| 6,748,215 B1 | * | 6/2004 | Chen et al. .................. 455/434 |

FOREIGN PATENT DOCUMENTS

EP     1 424 862 A   *   6/2004   ............ H04Q/7/32

* cited by examiner

Primary Examiner—Charles N. Appiah

(57) ABSTRACT

A multi-mode mobile station independently determines the radio signal quality of a serving mobile system by evaluating the error rate associated with the received forward-link-channel messages. In response to a determination that the calculated error rate is greater than an acceptable threshold level, the mobile station then attempts to access an alternative service system capable of providing better and more reliable telecommunications service.

18 Claims, 5 Drawing Sheets

WIRELESS NETWORK SYSTEM SELECTION MECHANISM WITHIN A MOBILE STATION

BACKGROUND OF THE INVENTION

1. Technical Field of the Invention

The present invention relates generally to wireless communications systems, and more specifically, to mobile stations having multi-mode capabilities.

2. Description of Related Art

With the advent of wireless telecommunications systems, a number of different-protocols, procedures and systems have been developed to effectuate radio communications within wireless telecommunications networks. Wireless telecommunications systems, such as Advanced Mobile Phone System (AMPS), Time Division Multiple Access (TDMA), and Code Division Multiple Access (CDMA) systems are all examples of various wireless telecommunications standards and protocols. Within a given telecommunications system, such as CDMA, there may also exist a number of different protocols, frequencies, and parameters. Examples of such frequencies may include 800 MHz and 1900 MHz. Further examples of such protocols may include Personal Communications System (PCS) and Global System for Mobile (GSM).

Given the great number of wireless telecommunications service providers and respective service areas associated thereto, more and more geographic areas are being covered by multiple system providers. Each system within a particular geographic service area then provides an overlapping coverage with other system providers and competes for its own customers and service revenue. As an illustration, an AMPS service provider as well as a CDMA service provider may concurrently provide overlapping service coverage over a particular geographic area and compete for service revenue therein. Mobile subscribers, as a result, benefit from such multiple overlapping coverage by being able to choose from a number of different providers, service quality, and service plans.

With the development of telecommunications technology, mobile stations have also been improved wherein a single mobile station is capable of interfacing to and communicating over a number of different network systems using different protocols. For example, a mobile station capable of selectively communicating over two different telecommunications protocols is known as a "dual-mode" terminal. A dual-mode mobile station, for example, enables a mobile subscriber to communicate over a preferred or home service provider's communication system until the mobile station travels or roams outside of the respective coverage area. In response to a determination that the preferred communication system is no longer available, the dual mode mobile station then utilizes the available secondary or alternative telecommunications system with different protocol. By selectively switching over to the secondary telecommunications system, the dual mode mobile station is able to continuously provide radio communications service without interruption to its associated user.

A multi-mode mobile station typically provides such capability by maintaining a preferred provider or system list. When a mobile station is first turned on or initialized, the mobile station attempts to access the system identified as the most preferred system. As described, this identification may be made by referencing a system preference list maintained within the multi-mode mobile station. In response to a determination that the most preferred system is not available, the mobile station then attempts to access the next system identified by the system preference list. The mobile station repeats the above access processes until an acceptable system is allocated or the systems associated with the priority list are exhausted. A similar re-selection may occur when a mobile station already registered with a first telecommunications system travels into an area covered primary by a second telecommunications system. As a result, in response to a determination that the current signal quality associated with the first telecommunications system is falling below the acceptable threshold level, the mobile station then attempts to access the second telecommunications system.

Conventionally, a multi-mode mobile station monitors a particular message transmitted over a forward-link channel associated with the preferred service provider to determine its access status. As long as the mobile station is able to periodically receive that particular message within a predefined time period, the mobile station maintains its access to that particular service provider. As an illustration, within a CDMA system, the mobile station maintains its access to the preferred CDMA system as long as the mobile station receives a page channel (PCH) message every 3 seconds as required by T30m of Interim Standard 95 (IS-95). However, maintaining access to a particular service provider solely based on the number of particular forward link messages received within a given time period is inefficient and undesirable. There may be instances where even though the requisite PCH messages are periodically received from a CDMA service provider, the "health" of the overall system is not acceptable. Accordingly, the health of the system may not be properly determined by merely considering the number of messages received within a given time period. Consequently, only a few valid PCH messages would need to be received for a mobile station to continuously use the preferred system while another system (such as another CDMA or AMPS) is available and might be capable of providing better or more reliable telecommunications service. Maintaining access to such less desirable system while another more reliable system is available to service the mobile station causes undesirable and inefficient results. For example, such poor system condition increases the probability of failure for both mobile originated and terminated calls. It further causes poor handoffs to other systems.

Accordingly, there is a need for a mechanism to enable a multi-mode mobile station to more effectively select an optimal network system.

SUMMARY OF THE INVENTION

The present invention discloses a method and apparatus for selectively accessing a desirable mobile service system by a multi-mode mobile station. A multi-mode mobile station prioritizes the compatible mobile service systems therein. When initialized, the mobile station accesses the most preferred mobile service system available thereto within a particular service area. Thereinafter, in response to a determination that the quality of forward channel messages received from the selected mobile service system is below the indicated threshold value, the multi-mode mobile station attempts to access the next preferred mobile service system.

The multi-mode mobile station first attempts to determine the access status of the selected mobile service system by determine whether a requisite number of forward channel messages is received and properly demodulated. In response to a determination that the mobile station failed to receive the requisite number of control channel messages, the multi-mode mobile station selects the next available service system in a conventional manner. However, even if the requisite number of control channel messages are properly received, the mobile station then determines the "health" of the received messages by evaluating the error rate associated with the received messages.

Accordingly, although the mobile station is capable of maintaining its access to the most preferred service system, the multi-mode mobile station voluntarily selects another compatible mobile service system in order to acquire an alternative system that might be able to provide better or more reliable radio service.

In one aspect, the present invention includes a method and apparatus for enabling a multi-mode mobile station to efficiently select and access a radio service system within a multiple system coverage area.

In another aspect, the present invention includes a method and apparatus for determining the access status of a particular mobile system by evaluating the number of control channel messages as well as the quality of those received messages.

In yet another aspect, the present invention includes a method and apparatus for selecting a mobile service system based on the quality of the forward channel messages received by a multi-mode mobile station.

In yet another aspect, the present invention discloses a method and apparatus for determining the quality of the received forward paging channel messages by calculating the Frame Error Rate (FER) associated therewith.

In still another aspect, the present invention provides a method and apparatus for selectively communicating over a first radio system and a second radio system by evaluating the error rates associated with forward channel messages transmitted by said radio systems.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
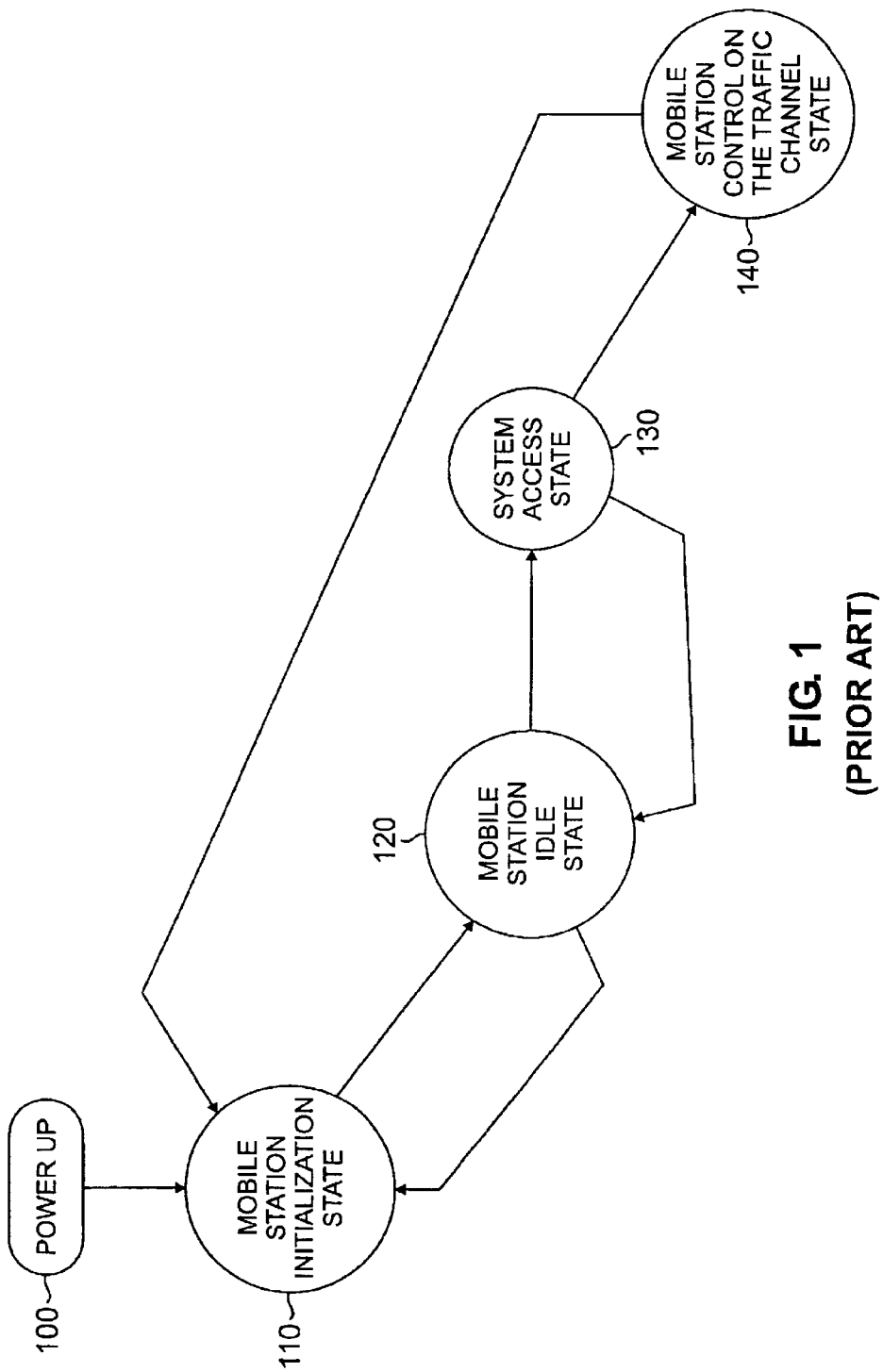
FIG. 1 is a diagram illustrating the different states performed by a multi-mode mobile station to select a particular mobile service system for communication.

FIG. 1 is a diagram illustrating the different states performed by a multi-mode mobile station to select a particular mobile service system for communication. Whenever a multi-mode mobile station enters power up state 100 by turning on the mobile station for the first time or being invoked out of the inactive mode, the mobile station attempts to initiate all relevant variables and parameters by entering initialization state 110. During the initialization state 110, the multi-mode mobile station determines which particular service system to use. As an illustration, the mobile station may select from Code Division Multiple Access (CDMA) System, Time Division Multiple Access (TDMA) System, Advanced Mobile Phone System (AMPS), Personal Communications System (PCS) and Cellular, etc. Even within the same CDMA systems, the mobile station may choose between System A and System B.

Typically, a multi-mode mobile station includes a priority list prioritizing the compatible mobile service systems therein. As an illustration, within a dual-mode mobile station, the CDMA system is pre-selected or programmed as the preferred service system and the AMPS system is designated as the less preferred or alternative service system. During the initialization state, the multi-mode mobile station then attempts to access the most preferred service system indicated by this priority list. Only when the most preferred service system is not available within the current service area, does the mobile station then attempt to access the next service system indicated on the priority list.

Once a particular system is selected, the mobile station tunes to the selected system. If the selected system is analog, for example, the mobile station begins its analog operations. In case the selected system is CDMA, the mobile stations begins its CDMA operations. Such operations include acquiring a pilot channel associated with the selected CDMA system. Once a pilot channel is acquired for the CDMA system, the mobile station then synchronizes itself with the providing CDMA system by tuning to an appropriate sync channel. A base station providing radio coverage over the appropriate geographic area transmits sync channel messages over a sync channel and contains requisite information such as system time, pilot PN offset, long code state, etc. Utilizing these parameters to synchronize with the serving CMDA system, the multi-mode mobile station then moves to idle state 120.

By entering the idle state 120, the multi-mode mobile station actively monitors the messages communicated over the paging channel. Such messages include both broadcast messages as well as messages directly to a specific mobile station. Accordingly, the paging channel enables the serving base station to communicate with the multi-mode mobile station when the mobile station is not on a traffic channel. The page channel also enables the mobile station to obtain system information from the serving base station. The system information, for example, contains both network wide and base station specific parameters which are needed by the multi-mode mobile station to send messages to the serving base station. The paging channel is also utilized by the mobile station to originate an outgoing call or to receive an incoming call request.

Whenever the multi-mode mobile station wishes to request a mobile service, the mobile station enters the access state 130. During this state, the mobile station communicates with the serving base station via communicating over an access channel. As an illustration, the multi-mode mobile station may send an originating message over an access channel to request an outgoing call connection. Similarly, whenever an incoming call connection is directed to a particular mobile station, the serving base station first sends a page message over a page channel to locate the destination mobile station. The mobile station, in response to the paged message, then responds over an access channel.

The multi-mode mobile station also periodically registers with the serving base station to update its geographic location. Such a registration message is sent over an access channel as well. Once a particular service has been negotiated over an access channel, such as an incoming call or outgoing call connection, the mobile station then enters the traffic channel state 140 to communicate data/information. The multi-mode mobile station may also perform a soft or hard handoff to a different coverage area or request additional services therefrom.

Accordingly, the multi-mode mobile station attempts to access the most preferred and available mobile service system predefined therein and monitors the appropriate control channel until a particular service is requested or initiated. The multi-mode mobile station further stays with that particular mobile service system until the selected service system is no longer capable of providing mobile service thereto. When the signal quality transmitted by the selected mobile service system becomes no longer acceptable or available, the multi-mode mobile station then attempts to access an alternative mobile service system to continuously provide mobile service to an associated end user.

Figure 2:
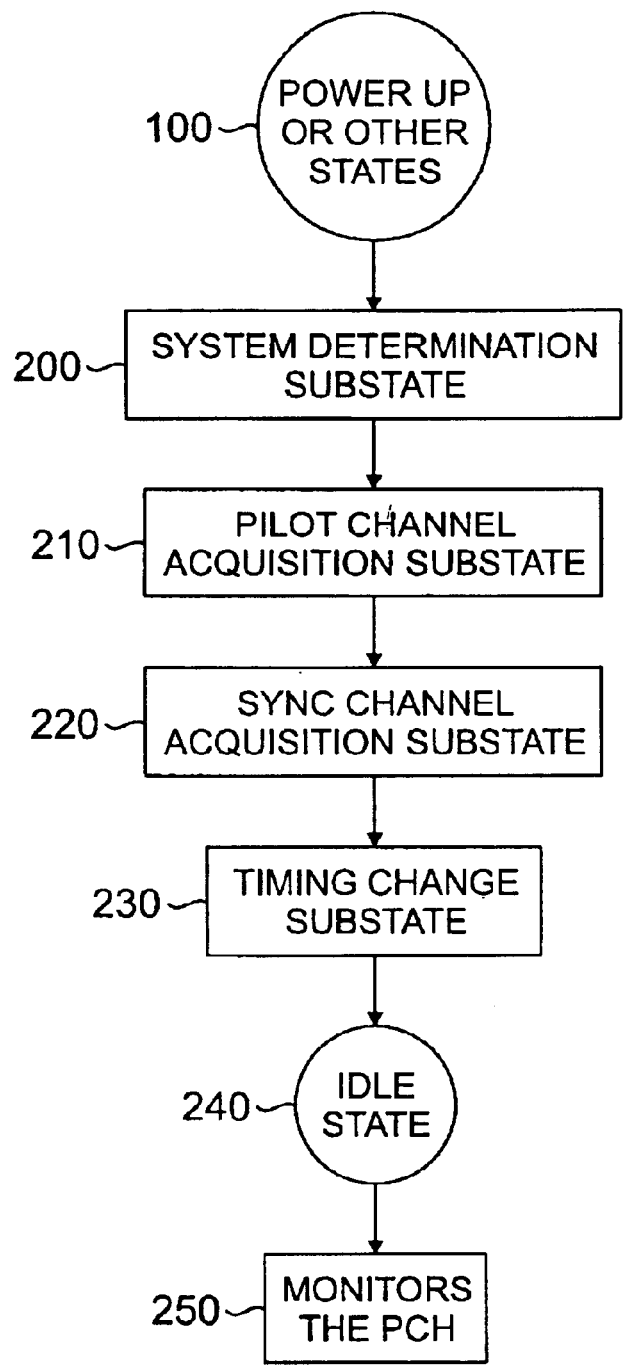
FIG. 2 is a flow diagram illustrating the steps performed by a multi-mode mobile station to access and maintain a particular mobile service system.

FIG. 2 is a flow diagram illustrating the steps performed by a multi-mode mobile station to access and maintain a particular mobile service system in a conventional manner. As fully described above, the multi-mode mobile station first enters the initialization state when powered up or re-initialized 100. Utilizing a priority list or other determination methods, the mobile station then selects a particular mobile service system to access at step 200. The multi-mode mobile station attempts to determine whether the selected mobile service system is available within the current geographic area by searching for a pilot channel associated with the selected mobile service system at step 210. In response to a determination that the requisite pilot signal is detected and recognized, the multi-mode mobile station then attempts to synchronize with the selected system (e.g., CDMA system) by acquiring the requisite sync channel at step 220. Utilizing the system parameters and timing information received over the sync channel, the mobile station then synchronizes with the selected system and acquire the proper offset at step 230. The multi-mode mobile station is now in idle state and capable of initiating mobile service with the serving base station at step 240. Thereafter, the multi-mode mobile station monitors the page channel at step 250 to determine whether the selected mobile service system is capable of continuously providing the requisite mobile service. As an illustration, after properly synchronizing with a particular mobile system service, the mobile station may travel and roam out of the current coverage area. As another illustration, the mobile station may travel into a geographic area still covered by the selected mobile service system, but terrestrial conditions associated with the newly entered area prevents the mobile station from properly communicating with the serving base station. Accordingly, in order to ensure that the mobile station is capable of communicating with the selected mobile service system, the mobile station constantly monitors the page channel on the forward link to determine whether a requisite number of page messages are received within a given time period. As an example, in accordance with the Interim Standard 95 (IS-95), the mobile station remains within a selected CDMA system and assumes the paging channel is acceptable if the arrival rate of valid page messages is sufficient to avoid expiration of IS-95 timer T30m. Accordingly, as long as the minimum number of page channel messages are received and demodulated by the multi-mode mobile station, the mobile station assumes that the quality of the radio service is acceptable and stays with the selected service system. As a result, using existing methods, only a few valid PCH messages would need to be received for the multi-mode mobile station to continue using CDMA instead of an alternative analog system (or another CDMA system). This is inefficient and undesirable if the alternative system is available to provide better or more liable service. Such a mechanism for remaining with the existing poor service system until complete loss of paging channel as defined by the T30m. standard generates high probability of failure for both mobile originated and terminated calls as well as poor handoff to an alternative system due to incorrect system targeting.

Figure 3:
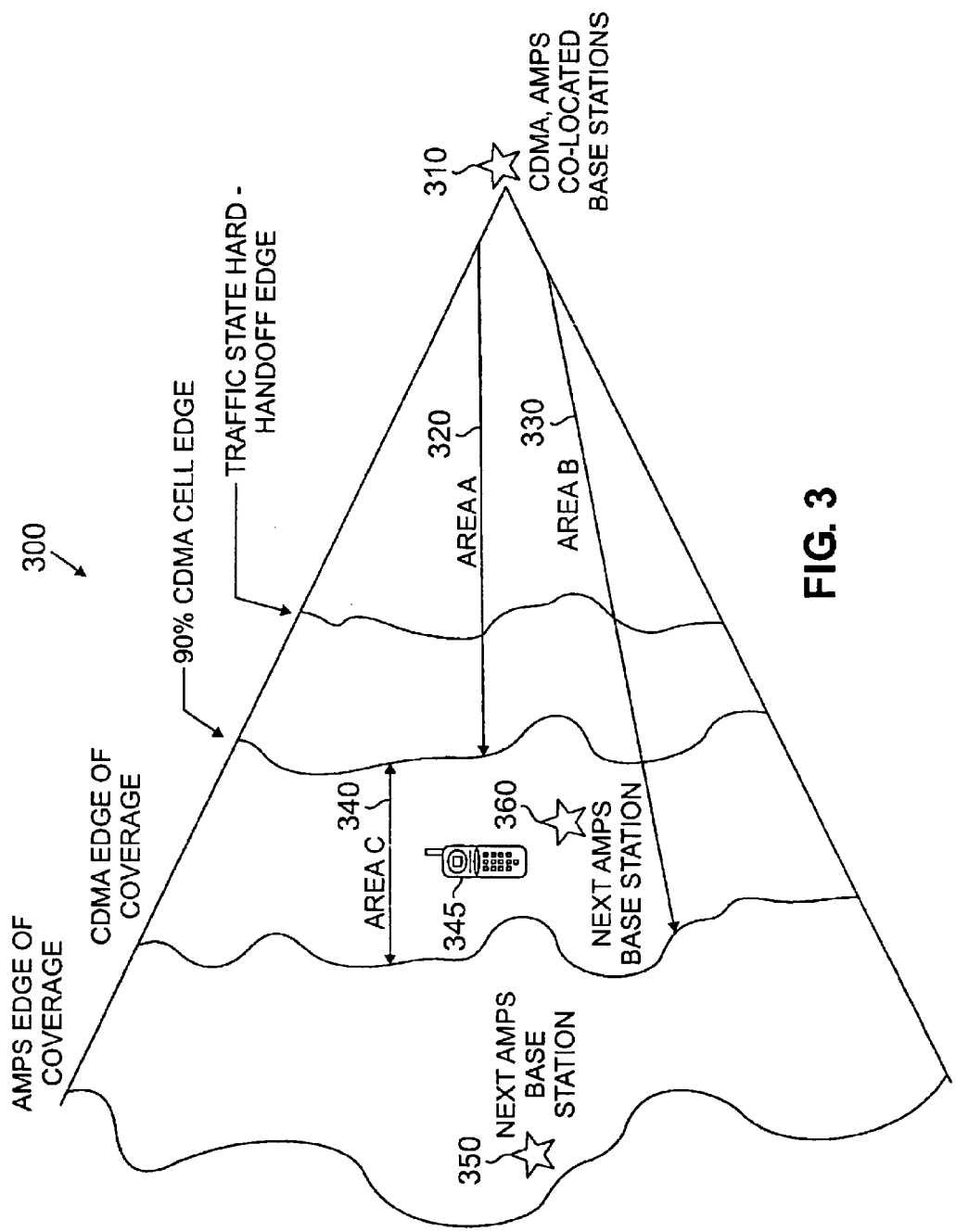
FIG. 3 is a diagram illustrating the gray zone within a multi-coverage telecommunications service area.

FIG. 3 is a diagram illustrating a "gray zone" within a multi-coverage telecommunications service area. Due to a large number of mobile telecommunications service providers and systems in developed countries, such as the United States, a particular geographic area is typically covered by two or more service providers and associated service systems. As illustrated in FIG. 3, a particular service area 300 is being covered by two different service system providers. CDMA and AMPS base stations are co-located at a first geographical location 310 as illustrated. Assuming that the CDMA system is preferred over the AMPS system, a first coverage area extending out to the ninety percent (90%) of the CDMA cell edge represents the desired CDMA coverage area. As shown in FIG. 3, this optimum CDMA coverage area is represented by Area A 320. On the other hand, the full CDMA coverage area as determined by the loss of pilot, paging, and synch channels are represented by Area B 330 as further illustrated in FIG. 3. As a result, although the requisite pilot, paging, and synch signals may be received and demodulated within Area B 330, the CDMA system would provide the desired radio service only within Area A 320. Accordingly, the remaining area depicted as Area C 340 is then sometimes identified as a "Gray Zone." A dual-mode mobile station located within the Gray Zone would therefore show service indication although Ec/Io is poor and the requisite paging channel is lost periodically but never for more than three (3) seconds as required by the IS-95 T30m timer. The dual-mode mobile station is thereby located at the relevant CDMA cell edge and at an outer limit of forward and/or reverse link budget of the serving CDMA system. As described above in FIG. 2, a mobile station located within a Gray Zone tends to experience higher probability of failure for both mobile originated and terminated calls. The dual-mode mobile station also tends to perform poor or incorrect handoff to an alternative system, such as AMPS, due to incorrect system targeting.

Figure 4:
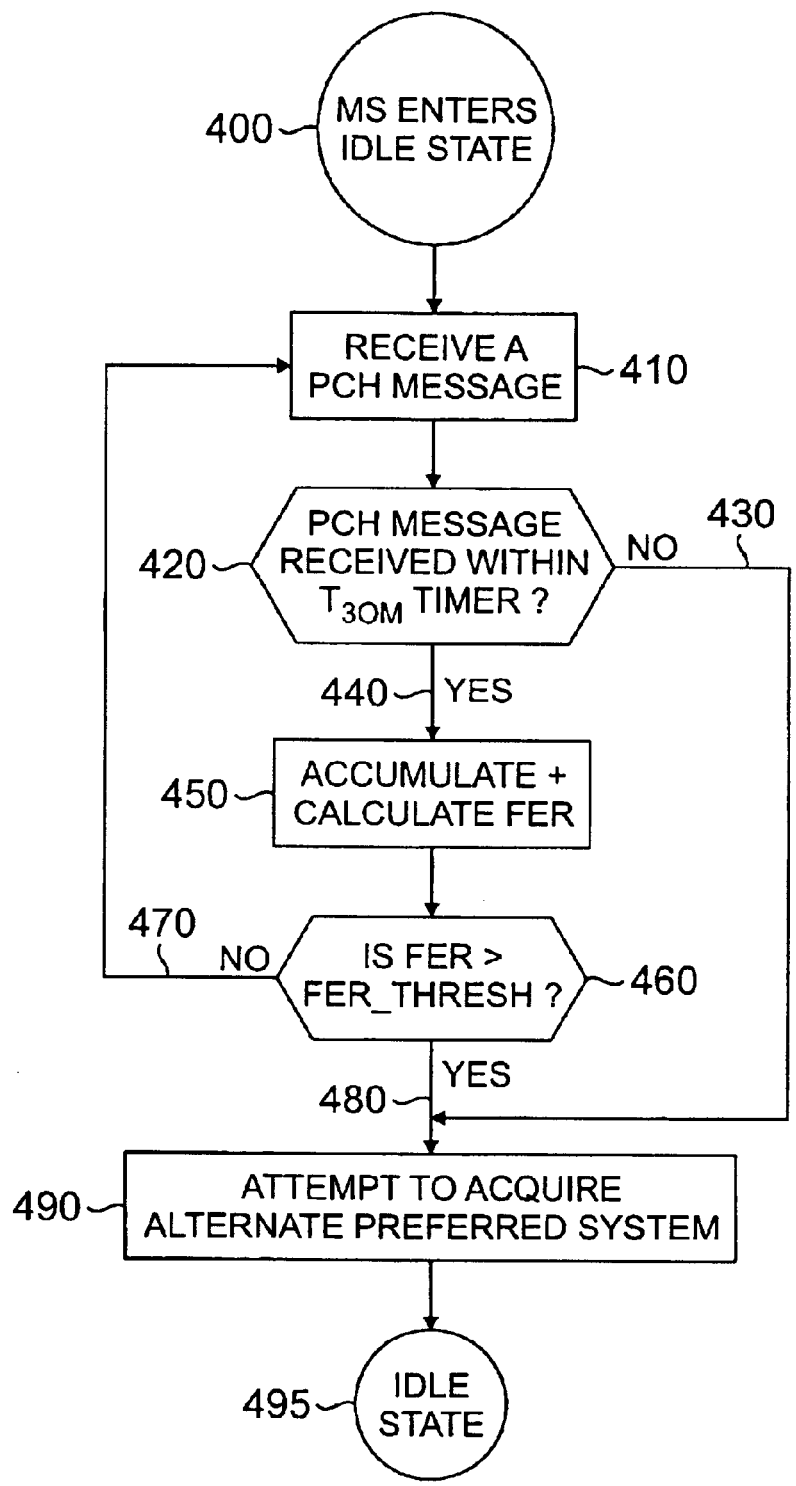
FIG. 4 is a flow diagram illustrating the steps performed by a multi-mode mobile station to select an alternative service system in accordance with the teachings of the present invention.

In accordance with the teachings of the present invention, a dual-mode mobile station 345 located within a Gray Zone (Area C 340) as illustrated in FIG. 3 is then selectively instructed to access an alternative system that is overlaid on the current service area and capable of offering a substantially better grade of mobile service. As shown in FIG. 3, a second AMPS base station 360 located within the CDMA. Gray Zone 340 and a third AMPS base station 350 located neighboring thereto are able to provide better radio service to the multi-mode mobile station 345. Instead of remaining on the existing poor CDMA system until the monitoring paging channel is completely lost and then being forced to select an alternative service system, such as AMPS, a multi-mode mobile station attempts to access an alternative system in response to a determination that the current preferred system is no longer able to provide an optimum radio signal quality. Such a determination is made even though the requisite number of forward link messages, such as paging channel messages, are received and adequately demodulated by the mobile station within a given time FIG. 4 is a flow diagram illustrating the steps performed by a multi-mode mobile station to select an alternative service system in accordance with the teachings of the present invention. As fully described in FIG. 2, a multi-mode mobile station selects the most preferred service system available in an associated service area, synchronizes with appropriate parameters, and enters the idle state at 400. Thereafter, the multi-mode mobile station monitors the page channel to periodically receives a requisite page channel message at 410. The multi-mode mobile station then determines whether a page channel message has been received within a required time period at 420. As an illustration, within a CDMA system, a mobile station has to receive and be able to adequately demodulate a PCH message every 3 seconds in accordance with the IS-95 timer T30m. In response to a determination that a proper PCH message has not been received within the determined time period (no decision link 430), the mobile station is then no longer in service with the preferred mobile service system and attempts to access an alternative service system at 490 in a conventional manner. This is a situation wherein the mobile station is completely out of the serving CDMA system's coverage area and is no longer able to detect or demodulate the forward channel messages transmitted by the serving CDMA base station.

On the other hand, in response to a determination that the mobile station is still receiving and capable of adequately demodulating a PCH message as required by the appropriate standard (yes decision link 440), in accordance with the teachings of the present invention, instead of assuming that the "health" of the paging channel is good and acceptable, the mobile station then evaluates the error rates associated with the PCH message received therein at 450. As an example, the dual-mode mobile station attempts to evaluate the actual "health" of the page channel by measuring frame erasure rates (FER) associated with the received PCH messages. The FER for the paging channel is defined as the number of invalid paging channel messages (messages with bad Cyclic Redundancy Check—CRC) divided by the total number of paging channel messages the mobile station attempted to receive within a given time period. The relevant measurement period can be a sliding window. The measured FER is then compared against a predetermined threshold value at 460. If the measured FER within a given time window is less than the specified threshold value (No decision link 470), a determination has been made that the health of the system is still acceptable and the mobile station returns to step 410 to repeat the above described process. On the other hand, in response to a determination that the evaluated FER value is greater than the specified threshold value (Yes decision link 480), the mobile station then determines that the health of the system is no longer acceptable. In accordance with the teachings of the present invention, although the requisite number of PCH messages have been received, the mobile station then voluntarily attempts to select and access an alternative system at step 490. As described above, the mobile station, for example, references its internal service priority list and attempts to access an alternative service system specified therein. The alternatively accessed service system may be of higher or lower priority than the previous service system referenced by the service priority list.

Alternatively, the mobile station may also determine the health of the received PCH messages by correlating the PCH FER to the measured Ec/Io of the pilot channels associated thereto. Ec/Io is a ratio in (dB) between the pilot energy accumulated over one PN chip period (Ec) to the total power spectral density (Io) in the received bandwidth. Accordingly, the Ec/Io could be used directly as an indicator of "health."

The threshold value for determining the health of the page channels may also be dynamically defined. As an illustration, the threshold value may be dynamically assigned based on the history of FER versus access failure rates (origination or termination) on the paging channel. A mobile user or mobile manufacturer may also define an acceptable threshold value therein.

Upon successfully accessing an alternative service system, the mobile station then enters the idle state 495 and starts the monitoring process as fully described above to again determine whether the selected service system is capable of continuously providing acceptable radio service.

Figure 5:
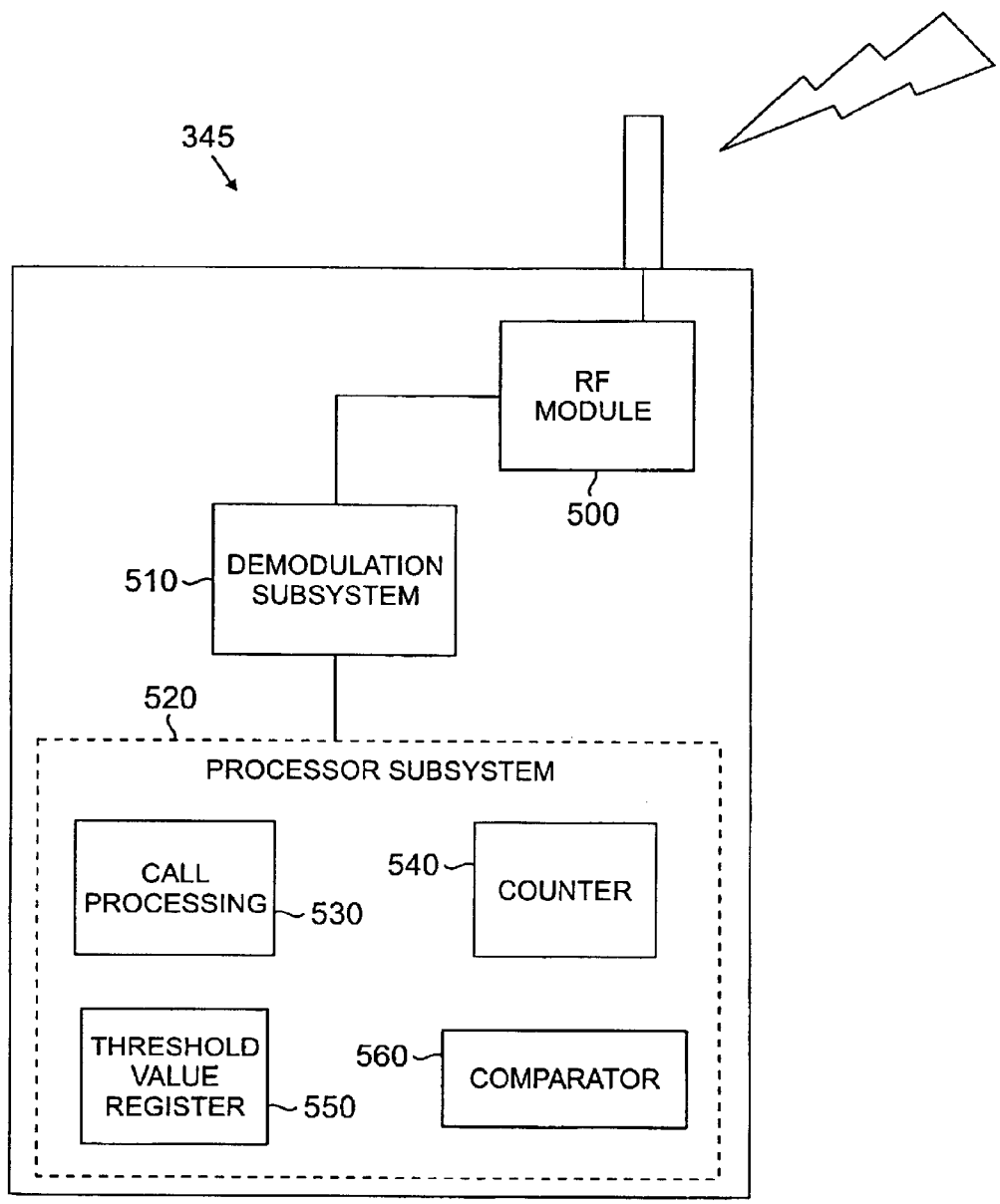
FIG. 5 is a block diagram of a multi-mode mobile station in accordance with the teachings of the present invention.

FIG. 5 is a block diagram of a multi-mode mobile station in accordance with the teachings of the present invention. A mobile station 345, in accordance with the teachings of the present invention, includes a radio-frequency (RF) module 500 for receiving radio signals transmitted by a serving service system. The received signal signals are then demodulated by a demodulation subsystem 510. A processor subsystem 520 associated within the mobile station then includes a counter 540 for determining the FER value associated with the received PCH messages within a given time window as fully described above in FIG. 4. The calculated FER value is then compared against a threshold value stored within a threshold value register 550 by a comparator 560. In response to a determination that the calculated FER value is greater than the specific threshold value, the call processor 530 is invoked to initiate the process for accessing an alternative service system as fully described above.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A multi-mode mobile station comprising:
   a radio frequency (RF) module capable of accessing a first radio system using a preferred radio protocol and further capable of accessing a second radio system using a less-preferred radio protocol; and
   processing circuitry associated with said RF module capable of determining the quality of first control channel signals received from said first radio system and determining the quality of second control channel signals received from said second radio system, wherein
      said processing circuitry determines the quality of said first control channel signals by determining a number of control messages received during a predetermined time period in a first control channel in which said first control channel signals are transmitted and further determining if said number of received control messages exceeds a minimum threshold value, and
      said processing circuitry, in response to a determination that the quality of said first control channel signals is sufficient to prevent said multi-mode mobile station from losing access to said first radio system, further determines from the quality of said first control channel signals whether said first radio system is able to provide an optimum signal quality.

2. The multi-mode mobile station as set forth in claim 1, wherein said processing circuitry, in response to a determination that said first radio system is not able to provide an optimum signal quality, determines from the quality of said second control channel signals whether said second radio system is able to provide a better radio service than said first radio system.

3. The multi-mode mobile station as set forth in claim 2, wherein said processing circuitry, in response to a determination that said second radio system is able to provide a better radio service than said first radio system, causes said RF module to access said second radio system instead of said first radio system.

4. The multi-mode mobile station as set forth in claim 3, wherein said first control channel signals comprise at least one of: 1) pilot channel signals associated with said first radio system and 2) paging channel signals associated with said first radio system.

5. The multi-mode mobile station as set forth in claim 4, wherein said second control channel signals comprise at least one of: 1) pilot channel signals associated with said second radio system and 2) paging channel signals associated with said second radio system.

6. The multi-mode mobile station as set forth in claim 1, wherein said processing circuitry further determines the quality of said first control channel signals by determining a bit error rate associated with said received control messages.

7. The multi-mode mobile station as set forth in claim 6, wherein said preferred radio protocol is a digital radio protocol and said less-preferred radio protocol is an analog radio protocol.

8. The multi-mode mobile station as set forth in claim 7, wherein said preferred radio protocol is code division multiple access (CDMA) protocol.

9. The multi-mode mobile station as set forth in claim 7, wherein said less-preferred radio protocol is Advanced Mobile Phone System (AMPS) protocol.

10. A method of operating a multi-mode mobile station capable of accessing a first radio system using a preferred radio protocol and capable of accessing a second radio system using a less-preferred radio protocol, the method comprising the steps of:

determining the quality of first control channel signals received from the first radio system by determining a number of control messages received during a predetermined time period in a first control channel in which the first control channel signals are transmitted and determining if the number of received control messages exceeds a minimum threshold value;

determining the quality of second control channel signals received from the second radio system; and in response to a determination that the quality of the first control channel signals is sufficient to prevent the multi-mode mobile station from losing access to the first radio system, determining from the quality of the first control channel signals whether the first radio system is able to provide an optimum signal quality.

11. The method as set forth in claim 10, further comprising the step, in response to a determination that the first radio system is not able to provide an optimum signal quality, of determining from the quality of the second control channel signals whether the second radio system is able to provide a better radio service than the first radio system.

12. The method as set forth in claim 11, further comprising the step, in response to a determination that the second radio system is able to provide a better radio service than the first radio system, of causing the RF module to access the second radio system instead of the first radio system.

13. The method as set forth in claim 12, wherein the first control channel signals comprise at least one of: 1) pilot channel signals associated with the first radio system and 2) paging channel signals associated with the first radio system.

14. The method as set forth in claim 13, wherein the second control channel signals comprise at least one of: 1) pilot channel signals associated with the second radio system and 2) paging channel signals associated with the second radio system.

15. The method as set forth in claim 10, further comprising the step of determining the quality of the first control channel signals by determining a bit error rate associated with the received control messages.

16. The method as set forth in claim 15, wherein the preferred radio protocol and the less-preferred radio protocol is an analog radio protocol.

17. The method as set forth in claim 16, wherein the preferred radio protocol is code division multiple access (CDMA) protocol.

18. The method as set forth in claim 16, wherein the less-preferred radio protocol is Advanced Mobile Phone System (AMPS) protocol.

* * * * *

UNITED STATES PATENT AND TRADEMARK OFFICE
CERTIFICATE OF CORRECTION

| | |
|---|---|
| PATENT NO. | : 6,961,583 B2 |
| APPLICATION NO. | : 10/317336 |
| DATED | : November 1, 2005 |
| INVENTOR(S) | : Bryan Jeffrey Moles, Nim Keung Leung and Sing-Wai Wu |

It is certified that error appears in the above-identified patent and that said Letters Patent is hereby corrected as shown below:

Column 6, line 54, delete "." after the term "CDMA";

Column 6, line 67, insert --period.-- after the term "time".

Signed and Sealed this

Eighteenth Day of July, 2006

JON W. DUDAS
*Director of the United States Patent and Trademark Office*